(12) United States Patent
Hashimoto et al.

(10) Patent No.: US 7,704,394 B2
(45) Date of Patent: *Apr. 27, 2010

(54) HOLLOW FIBER MEMBRANE CARTRIDGE

(75) Inventors: Tomotaka Hashimoto, Fuji (JP); Daisuke Okamura, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 117 days.

This patent is subject to a terminal disclaimer.

(21) Appl. No.: 11/666,691

(22) PCT Filed: Dec. 13, 2005

(86) PCT No.: PCT/JP2005/022884

§ 371 (c)(1),
(2), (4) Date: Sep. 17, 2007

(87) PCT Pub. No.: WO2006/064808

PCT Pub. Date: Jun. 22, 2006

(65) Prior Publication Data

US 2008/0116128 A1    May 22, 2008

(30) Foreign Application Priority Data

Dec. 14, 2004  (JP) .............................. 2004-361354

(51) Int. Cl.
*B01D 63/02* (2006.01)

(52) U.S. Cl. .............. 210/321.89; 210/321.8; 210/500.23

(58) Field of Classification Search ............ 210/321.61, 210/321.79, 321.88; 96/8, 10
See application file for complete search history.

(56) References Cited

U.S. PATENT DOCUMENTS

| 6,126,819 A | 10/2000 | Heine et al. |
| 6,331,248 B1 * | 12/2001 | Taniguchi et al. ........ 210/321.8 |
| 6,620,319 B2 | 9/2003 | Behmann et al. |
| 7,160,455 B2 | 1/2007 | Taniguchi et al. |
| 7,578,940 B2 * | 8/2009 | Hashimoto et al. .......... 210/636 |

(Continued)

FOREIGN PATENT DOCUMENTS

CN        1482940 A       3/2004

(Continued)

OTHER PUBLICATIONS

Decision on Grant (corresponding Russian application) issued Dec. 2, 2008.

(Continued)

*Primary Examiner*—John Kim
(74) *Attorney, Agent, or Firm*—Finnegan, Henderson, Farabow, Garrett & Dunner, L.L.P.

(57) ABSTRACT

A hollow fiber membrane cartridge comprising a bundle of multiple hollow fiber membranes arranged so as to be vertical in an immersion vessel and comprising bond fixing layers capable of bond fixing of the hollow fiber membrane bundle at both ends thereof, wherein the morphology of each of the bond fixing layers is selected from the group consisting of a triangle, a rectangle and a hexagon, and wherein at least an edge of upper side bond fixing layer, the hollow of the hollow fiber membranes opens, and wherein the hollow fiber membrane bundle at a filtration zone side interface of the upper side bond fixing layer is in the form of multiple wisps.

6 Claims, 6 Drawing Sheets

U.S. PATENT DOCUMENTS

| | | |
|---|---|---|
| 2004/0045893 A1 | 3/2004 | Watanabe et al. |
| 2004/0178136 A1 | 9/2004 | Taniguchi et al. |

FOREIGN PATENT DOCUMENTS

| | | |
|---|---|---|
| EP | 0 920 904 A2 | 6/1999 |
| EP | 1 640 057 A1 | 3/2006 |
| JP | 04-046170 | 7/1992 |
| JP | 5-220357 | 8/1993 |
| JP | 9192458 | 7/1997 |
| JP | 2000-157846 | 6/2000 |
| JP | 2001-205054 | 7/2001 |
| JP | 2002-346345 | 12/2002 |
| JP | 2003-513784 | 4/2003 |
| JP | 2004-89800 | 3/2004 |
| SU | 1498531 A1 | 8/1989 |
| WO | WO 00/18498 | 4/2000 |
| WO | WO 2004/078326 A2 | 9/2004 |

OTHER PUBLICATIONS

Office Action dated Aug. 29, 2008 (corresponding Chinese patent application).

* cited by examiner

HOLLOW FIBER MEMBRANE CARTRIDGE

TECHNICAL FIELD

The present invention relates to an immersion type membrane cartridge using a hollow fiber membrane set to a suction type tank filter device or an immersion type filter device. More minutely, the present invention relates to a hollow fiber membrane cartridge used for a filter device that removes turbidity and bacteria from raw water such as river water, lake water, underground water, seawater, domestic liquid waste, industrial liquid waste, or sewage secondary treated water, membrane separation activated sludge device for carrying out solid-liquid separation of activated sludge by a membrane, or separation of valuable objects and non-valuable objects.

BACKGROUND ART

As a waste water treatment method, there is a membrane separation activated sludge method comprising immersing a membrane cartridge in an activated sludge tank and carrying out solid-liquid separation of the activated sludge and the treated water after the treatment. This method allows the concentration of the activated sludge (MLSS: Mixed Liquor Suspended Solid) to be set at a very large value from 5,000 to 20,000 mg/l for a filtering process. This advantageously allows the capacity of the activated sludge vessel to be reduced or enables a reaction time in the activated sludge vessel to be shortened. Further, the filtration with the membrane prevents suspended solids (SS) from being mixed into treated water, thus eliminating the need for a final sedimentation tank. This makes it possible to reduce the construction area of the treatment facility and to achieve filtration regardless of whether or not activated sludge is appropriately sedimented. This method thus has advantages such as a reduction in the load of activated sludge managing operation. Therefore, in recent years, the membrane separation activated sludge method has prevailed rapidly.

If hollow fiber membranes are used for the membrane cartridge, the high strength of the membrane itself hinders the surface of the membrane from being damaged as a result of contact with contaminants contained in the raw water. The membrane cartridge can thus be used for a long period. Moreover, this structure has the advantage of being capable of back wash reverse filtration, that is, injecting a medium such as treated water in a direction opposite to that of filtration to remove fouling to the membrane surface. In this case, however, effective membrane area may decrease unless filtration is carried out while excluding aggregates of activated sludge as well as contaminants from the raw water accumulating in the gap between the hollow fiber membranes. As a result, filtration efficiency lowers, thus stable filtration is prevented from being maintained over a long period.

Conventionally, the following method is used to avoid accumulating sludge or the like on the surfaces of hollow fiber membranes or between the hollow fiber membranes. That is, aeration by air or the like is performed from the lower portion of a membrane cartridge, and activated sludge aggregate and contaminants brought from raw water on the surface of a hollow fiber membrane or between hollow fiber membranes are removed in accordance with the oscillation effect of a membrane and agitation effect by movement of bubblers upward and thereby, accumulation of them is prevented. For example, a lower ring (or also referred to as skirt) is set to the lower portion of a hollow fiber membrane cartridge and a plurality of through-holes are formed on a lower-ring-side adhesion fixation layer to form an air pool in the end of the lower ring protruded from the lower ring by aeration from the lower portion of the cartridge. Thus, bubbles are uniformly generated from the plurality of through-holes and hollow fiber membranes are oscillated so that a suspended material deposited on the outer surfaces of the membranes are easily removed. (For example, refer to Patent Document 1).

According to this method, when filtering high-concentration MLSS such as the case of the membrane separation activated sludge method, there is an effect for removing the sludge between hollow fiber membrane bundles in accordance with the agitation effect by aeration and the oscillation effect of a membrane. However, a force for raising activated sludge aggregate or contaminants acts due to ascent of bubbles, and removed sludge moves to a position nearby the adhesion fixation layer, and they are not easily removed to the outside of the membrane bundle. Moreover, the hollow fiber membrane at the portion nearby the adhesion fixation layer has a small oscillation amplitude and therefore, it is impossible to sufficiently remove fouling from the surface of the membrane, and there is a problem that the surface of a hollow fiber is clogged because sludge is accumulated between membranes.

[Patent Document 1] JP-A-2000-157846

DISCLOSURE OF THE INVENTION

Problems to Be Solved by the Invention

It is an object of the present invention to provide a hollow fiber membrane cartridge for preventing accumulation of sludge aggregate and contaminants on the hollow fiber membrane cartridge at a necessary minimum amount of aeration and having a stable filtering performance for a long time.

Means for Solving the Problem

As a result of devoting themselves to study, the present inventor et al. have found that by using the following structure for a hollow fiber membrane cartridge, a sludge-fouling discharge route is formed and sludge aggregates and contaminants are discharged to the outside of the membrane cartridge without accumulating between hollow fiber membranes of the membrane cartridge and have completed the present invention.

That is, the present invention is described below.

(1) A hollow fiber membrane cartridge comprising a hollow fiber membrane bundle consisting of plural hollow fiber membranes and arranged in vertical direction in an immersion bath; and adhesion fixation layers for adhering and fixing the hollow fiber membrane bundle at the both ends, in which the shape of the adhesion fixation layers is selected from the group consisting of a triangle, rectangle, and hexagon and the hollow portions of the hollow fiber membranes open at least the end of an upper-side adhesion fixation layer, and the hollow fiber membrane bundle is in a state of plural small bundles on the filtration section-side interface of the upper-side adhesion fixation layer.

(2) The hollow fiber membrane cartridge described in the above Item (1), wherein the shape of the adhesion fixation layers for adhering and fixing the hollow fiber membrane bundle at the both ends is selected from the group consisting of a triangle, rectangle, and hexagon, and the hollow fiber membrane bundle is divided into plural small bundles between the lower-side adhesion fixation layer and the upper-side adhesion fixation layer.

(3) The hollow fiber membrane cartridge described in the above Item (1), wherein in the plural small bundles of hollow fiber membranes on the filtration section-side interface of the upper-side adhesion fixation layer, the distance between the nearest hollow fiber membranes is less than 2 mm in each small bundle, and the number of hollow fiber membranes constituting each small bundle is 10 or more and 1000 or less, and the distance between the nearest small bundles is 2 mm or more and 100 mm or less.

(4) The hollow fiber membrane cartridge described in the above Item (1), in which the upper-side and lower-side adhesion fixation layers include a resin, respectively, and the hardness (measured in accordance with JIS K6253) of the resin at the filtration section-side interface(s) of either or both of the adhesion fixation layers is 20 A or more and 90 A or less.

Effects of the Invention

The present invention makes it possible to prevent sludge from accumulating on the surface of a hollow fiber membrane and realize a filtering performance stable for a long time.

BRIEF DESCRIPTION OF THE DRAWINGS

FIGS. 3(a) and 3(b) are cross sectional illustrations showing an embodiment of a hollow fiber membrane cartridge of the present invention, respectively, in which FIG. 3(a) shows an example in which a bubble supply section is connected with a membrane cartridge and FIG. 3(b) shows an example in which the bubble supply section is separated from the membrane cartridge;

Figure 5A:
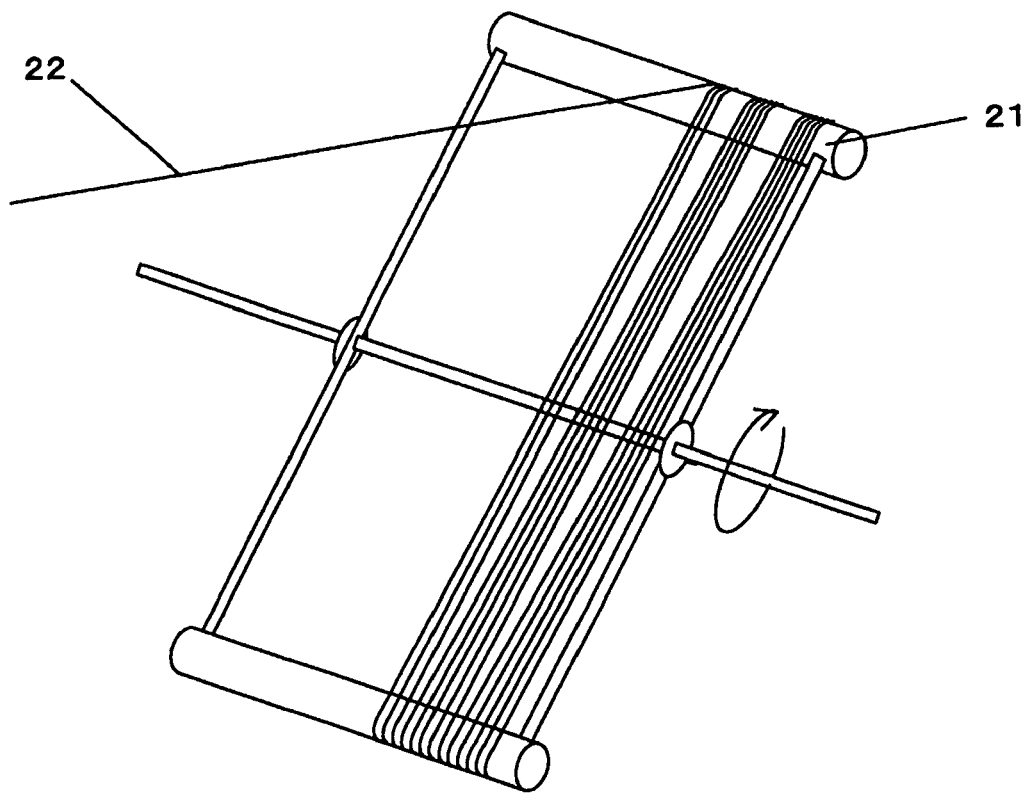
FIG. 5(a) is a schematic diagram showing a hollow fiber membrane winding cassette of Example 1.
Figure 5B:
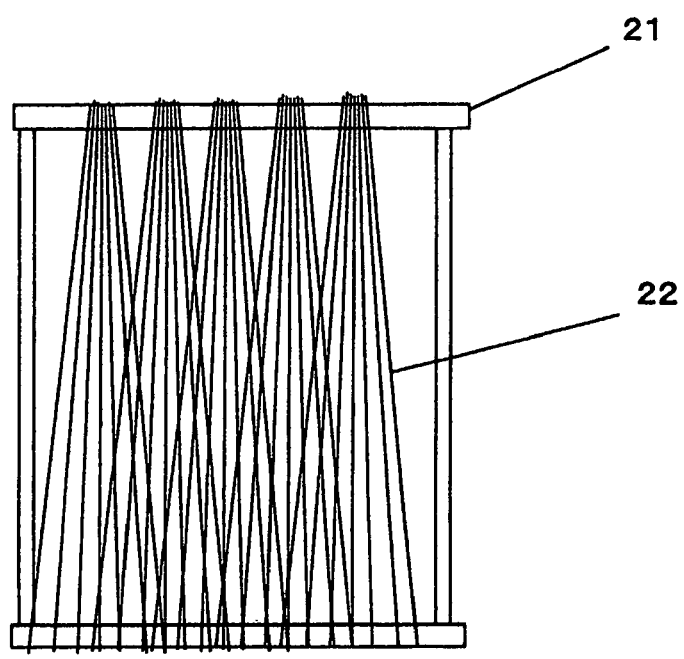
FIG. 5(b) is a schematic diagram showing a cartridge on which a small bundle structure is formed by changing winding pitches at the both ends at the time of winding.
Figure 5C:
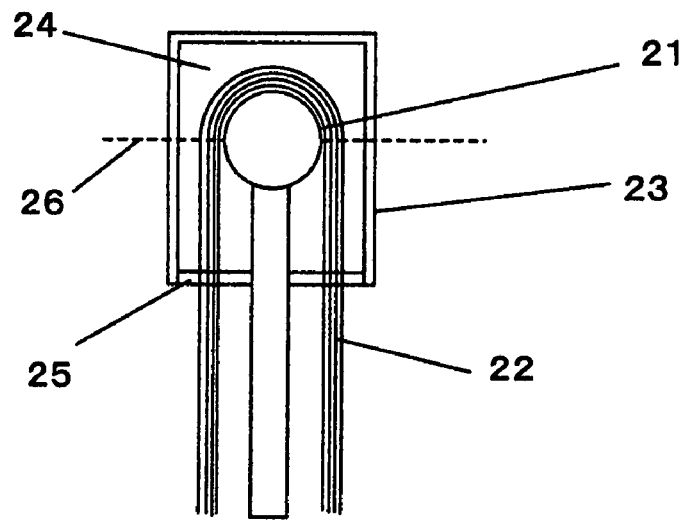
FIG. 5(c) is schematic diagram showing the positional relation between the cassette and a housing and the cutting position of an upper-side adhesion fixation layer.
Figure 5D:
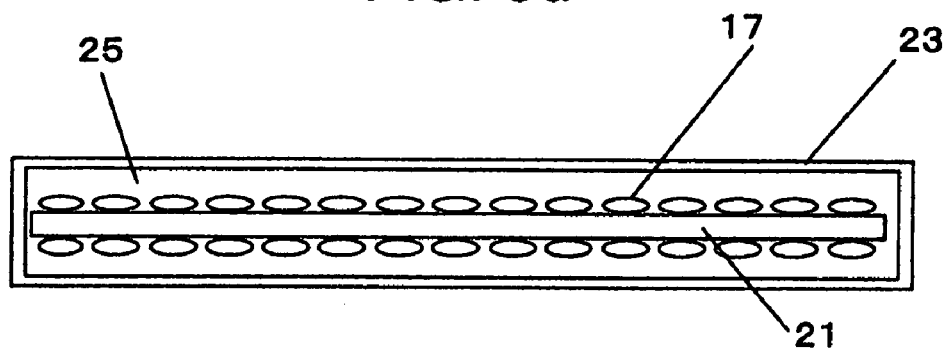
FIG. 5(d) is a schematic diagram showing an embodiment of hollow fiber membrane bundle arrangement on the interface of an upper-side adhesion fixation layer exposed due to cutting.
Figure 5E:
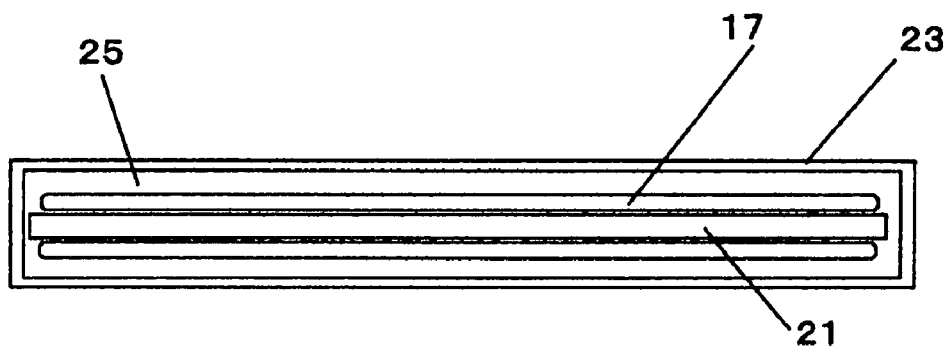

And, FIG. 5(e) is a schematic diagram showing an embodiment of hollow fiber bundle arrangement on the interface of a lower-side adhesion fixation layer exposed due to cutting.

DESCRIPTION OF REFERENCE NUMERALS

1: Hollow fiber membrane bundle
2: Upper-side adhesion fixation section
3: Lower-side adhesion fixation section
4: Upper-side adhesion fixation layer
5: Lower-side adhesion fixation layer
6: End surface of upper-side adhesion fixation layer
7: End surface of lower-side adhesion fixation layer
8: Bubble supply port
9, 11: Catchment chamber
10, 12: Catchment pipe
13: Side stem
14: Filtration section
15: Filtration section-side interface of upper-side adhesion fixation layer
16: Filtration section-side interface of lower-side adhesion fixation layer
17: Small bundle
18: Through-hole
19: Skirt
20: Gas jetting port
21: Winding pipe
22: Hollow fiber membrane
23: Housing
24: Urethane resin
25: Urethane resin
26: Cut surface

BEST MODE FOR CARRYING OUT THE INVENTION

Figure 1:
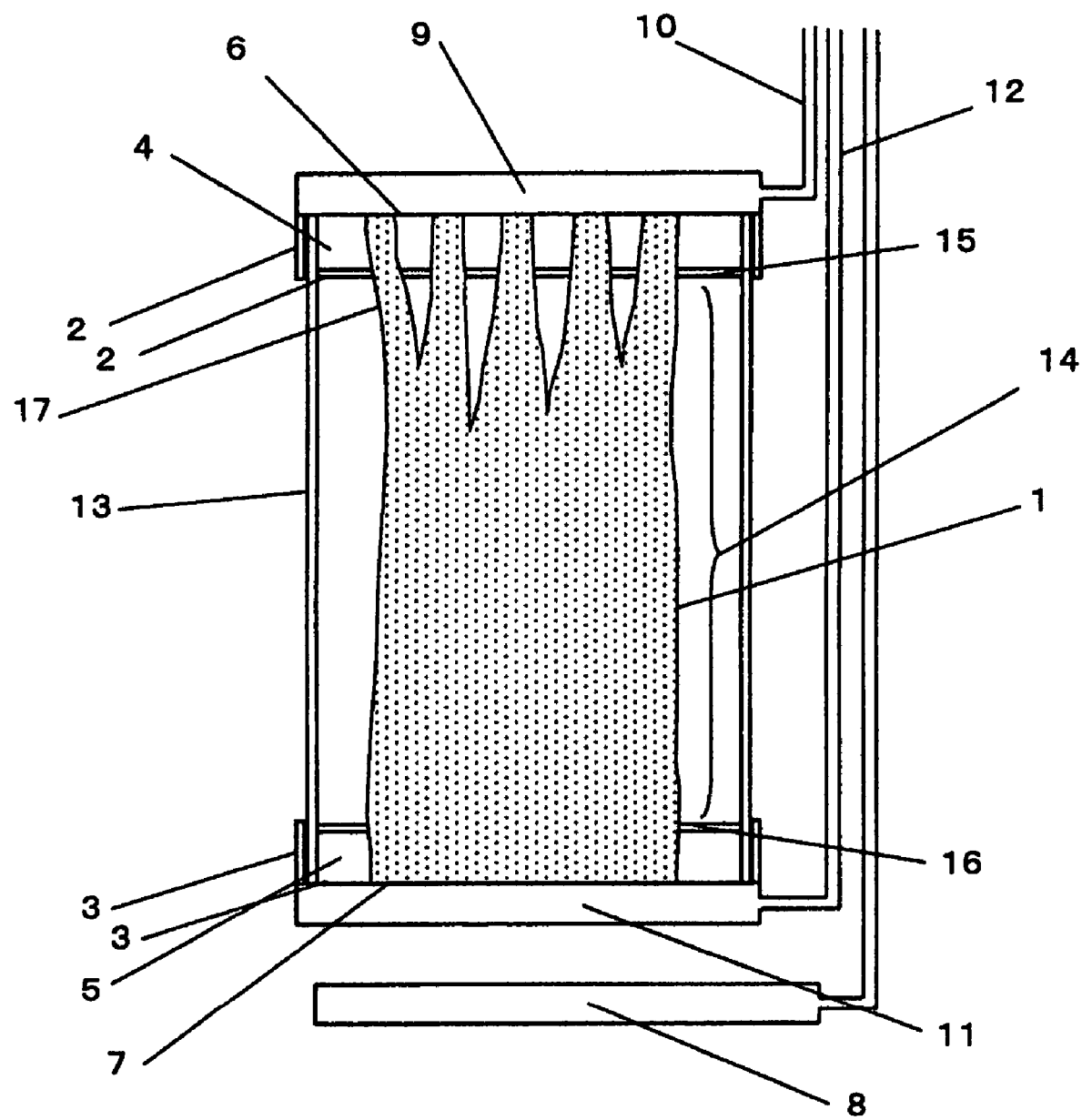
FIG. 1 is a cross sectional illustration showing an embodiment of a hollow fiber membrane cartridge of the present invention.

FIG. 1 shows an example for illustrating the structure of a hollow fiber membrane cartridge of the present invention. The hollow fiber membrane cartridge has a hollow fiber membrane bundle 1 consisting of plural hollow fiber membranes and a upper-side adhesion fixation section 2 and a lower-side adhesion fixation section 3 at the both ends of the hollow fiber membrane bundle 1, and the hollow fiber membranes are fixed by an upper-side adhesion fixation layer 4 and a lower-side adhesion fixation layer 5. The hollow fiber membranes open at the end surface 6 of the upper-side adhesion fixation layer and they may open or may not at the end surface 7 of the lower-side adhesion fixation layer. More preferable is a structure in which the hollow fiber membranes open only at the end surface 6 of the upper-side adhesion fixation layer and do not open at the end surface 7 of the lower-side adhesion fixation layer, because such a structure enables a lower-side catchment chamber as well as an auxiliary facility to be omitted.

A bubble supply port 8 for applying aeration to hollow fiber membranes may be integrated or may not with a membrane cartridge. When the membranes are not integrated with the cartridge, it is preferable to set the port 8 to a position to which aeration is applied to a membrane bundle under the membrane cartridge.

Moreover, when the port 8 is integrated with the cartridge, it is possible to jet vapor from an airtight pipe or jet vapor from an air pool after supplying the vapor into a skirt-like space and forming the air pool. When the port 8 is integrated with the cartridge, through-holes for bubbles supplied from the lower portion to escape to the upper portion are formed on the lower-side adhesion fixation layer 5.

FIG. 1 shows an example in which the end surfaces of an adhesion fixation layer open at both the upper side and the lower side of hollow fiber membranes and a bubble supply port for carrying out aeration is not integrated with a membrane cartridge. A catchment chambers 9 and 11 and catchment pipes 10 and 12 are connected to the upper and lower adhesion fixation portions.

The upper and lower adhesion fixation layers are connected by a side stem 13. In hollow fiber membranes, a portion not included in adhesion fixation layers at the both ends is defined as a filtration section 14, a portion facing the filtration section-side in the upper-side adhesion fixation layer 4 is defined as a filtration section-side interface 15 of the upper-side adhesion fixation layer, and a portion facing the filtration section in the lower-side adhesion fixation layer 5 is defined as the filtration section-side interface 16 of the lower-side adhesion fixation layer.

The hollow fiber membrane bundle 1 is divided into plural small bundles 17 on the upper-side adhesion fixation layer 4.

Bubbles due to aeration from the lower portion almost vertically rise in a gap between hollow fiber membranes while applying oscillation to the hollow fiber membranes. Amplitude of oscillation of the hollow fiber membranes are small nearby the upper-side adhesion fixation layer and the gap becomes small, and bubbles escape to the outside of a membrane cartridge.

When a filling factor is increased and the gap between hollow film membranes is small, solid matter contained in sludge, fiber-like object, and deposit of sludge cannot escape through the gap. As a result, they remain between hollow fiber membranes to decrease a filtering area and make filtering difficult.

To easily remove sludge deposit while increasing the filling factor of hollow fiber membranes, it is necessary to form a rarefaction portion in density of hollow fiber membranes nearby an upper-side adhesion fixation portion and use the rarefaction portion as a channel through which sludge deposit escape. That is, a structure is effective in which a hollow fiber membrane bundle is divided into plural small bundles to use the gap between hollow fiber membrane bundles as a channel of aeration bubbles and sludge deposit.

However, the gap between hollow fiber membrane bundles nearby an adhesion portion has a small amplitude of oscillation and sludge is easily deposited in the gap. Therefore, by forming small bundles, the distance between hollow fiber membranes in the small bundles decreases, a space in which sludge is accumulated is eliminated, and it is possible to prevent accumulation.

Figure 2:
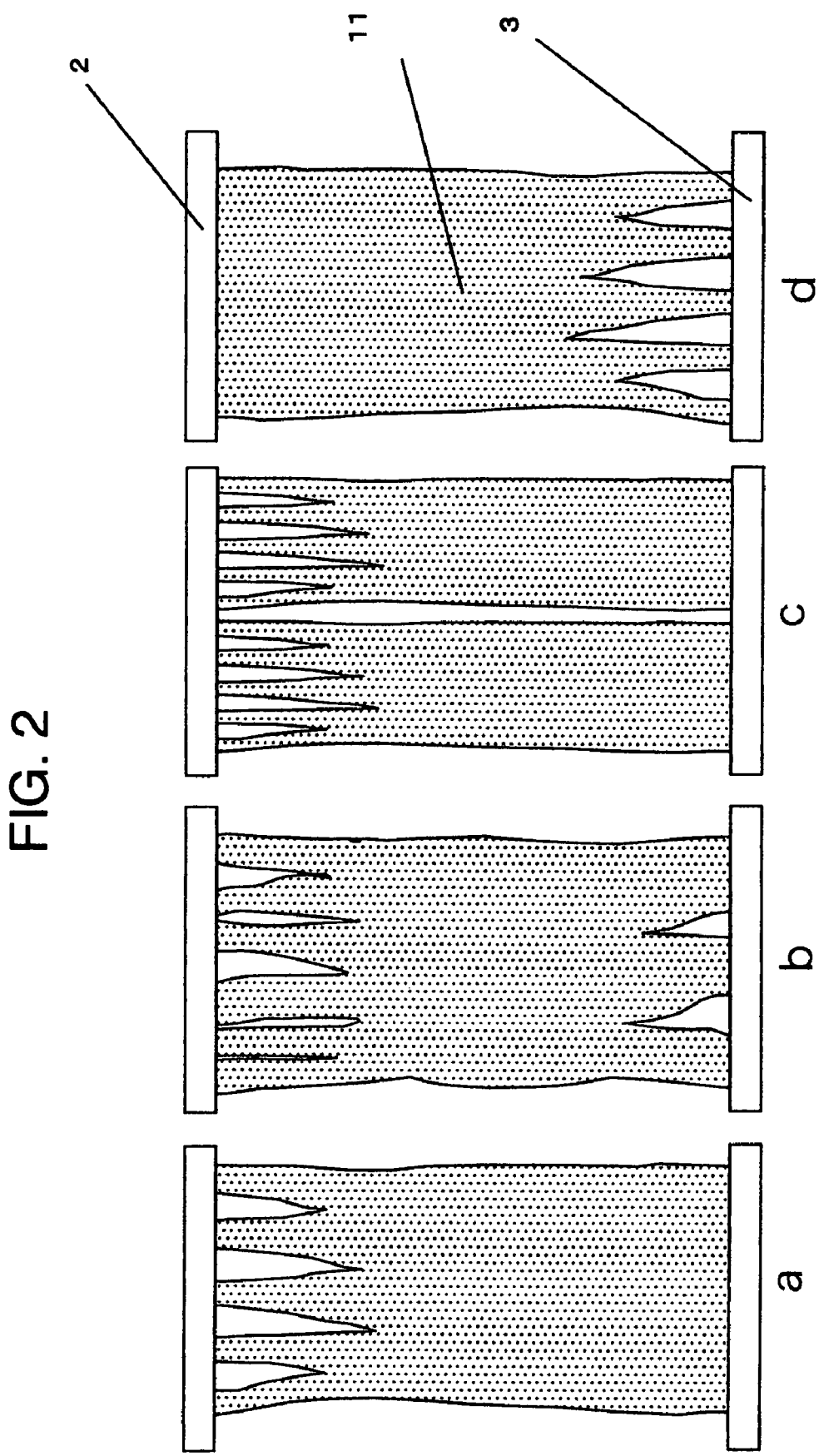
FIGS. 2(a) to 2(c) are schematic diagrams of bundle structures of a hollow fiber membrane cartridge of the present invention and FIG. 2(d) is the bundle structure of a hollow fiber membrane cartridge not included in the present invention.

Moreover, dividing a hollow fiber membrane bundle into plural small bundles in the portion between the lower-side adhesion fixation layer and the upper-side adhesion fixation layer is preferable because aeration from the lower portion oscillates all hollow fiber membranes thereby enhancing cleaning effect. Particularly, forming plural mutual confoundings between the lower-side adhesion fixation layer and the upper-side adhesion fixation layer on hollow fiber membranes is preferable because the effect of oscillation by aeration is further increased. Though the structure of a lower bundle may be a single bundle, plural small bundle structures may be used. It is preferable that hollow fiber membranes are divided into plural small bundles between the lower-side adhesion fixation layer and the upper-side adhesion fixation layer and there is confounding between hollow fiber membranes. FIGS. 2(a) to 2(d) show schematic views of bundle structures. Bundle structures of the present invention are shown in FIG. 2(a) to 2(c) but FIG. 2(d) is not included.

As used herein, the fact that there is confounding represents that the positional relation between hollow fiber membranes fixed by the lower-side adhesion fixation layer does not always coincide with the positional relation between hollow fiber membranes fixed by the upper-side adhesion fixation layer. Or it represents a state in which a rod-like object cannot be moved due to the intersection between the membranes when inserting the rod-like object between hollow fiber membranes from the outside of the cartridge on the filtration section-side interface of the lower-side adhesion fixation layer and then, moving the rod-like object to the upper-side adhesion fixation layer.

Confounding can be realized by dividing the either side of a single bundle of hollow fiber membranes into small bundle structures, keeping the shapes of the small bundle structures, and bonding the both ends of the hollow fiber membranes. For example, it is possible to form a bundle by winding hollow fiber membranes on two facing sides of a rectangular frame. As shown in FIGS. 5(a) and 5(b), it is also possible to form a confounding state by changing the interval between hollow fiber membranes to be wound on two sides.

It is preferable that the shape of an adhesion fixation layer to be adhered and fixed at the both ends of a hollow fiber membrane (the shape when viewing a hollow fiber membrane cartridge from the upper portion or lower portion after setting the cartridge so as to arrange the hollow fiber membranes vertically) is any one of triangle, rectangle, and hexagon because closet packing is realized when setting plural hollow fiber membrane cartridges to an immersion bath. Particularly, a rectangle shape is preferable because a channel for sludge deposit to escape to the outside of a cartridge becomes short and thereby sludge deposit is easily discharged with respect to the same number of hollow fiber membranes being used. Moreover, also when infilling plural cartridges, it is possible to independently set or remove any cartridge in the horizontal direction by arranging the cartridges in parallel and the setting operation is efficiently carried out.

In the case of small bundles of hollow fiber membranes at the filtration section-side interface of the upper-side adhesion fixation layer, it is preferable that the distance between nearest hollow fiber membranes in each small bundle is less than 2 mm and it is more preferable that the distance is less than 1 mm because it is possible to increase the effective membrane area of hollow fiber membranes and improve the filtering water quantity of a membrane cartridge. As used herein, the distance between hollow fiber membranes is the distance between outermost surfaces of the hollow fiber membranes. Moreover, the number of hollow fiber membranes constituting each small bundle preferably is 10 or more and 1000 or less and more preferably 20 or more and 500 or less. Accumulation of sludge aggregates and contaminants is small between hollow fiber membranes in these ranges. The distance between the nearest small bundles is 2 mm or more and 100 mm or less, more preferably 3 mm or more and less than 30 mm. In this range, it is possible to increase the filling factor of a hollow fiber membrane and filtering water quantity with little accumulation of sludge aggregates and contaminants. As used herein, the distance between small bundles represents the nearest distance among distances between outermost surfaces of hollow fiber membranes included in each small bundle.

The aggregation state of hollow fiber membranes in the lower-side adhesion fixation layer may be a single bundle structure or may be divided into plural small bundles.

Hereafter, an embodiment of a hollow fiber membrane cartridge of the present invention is described by referring to the accompanying drawings.

In FIG. 1, a hollow fiber membrane cartridge is constituted of a hollow fiber membrane bundle 1 in which plural hollow fiber membranes are collected, upper-side adhesion fixation section 2, and lower-side adhesion fixation section 3. In the both ends of the bundled hollow fiber membrane bundle 1, hollow fiber membranes are integrally connected by an adhesive and integrally connected in the upper-side adhesion fixation layer 4 and the lower-side adhesion fixation layer 5, and are opened at the end surface 6 of the upper-side adhesion fixation layer and at the end surface 7 of the lower-side adhesion fixation layer. Catchment chambers 9 and 11 and catchment pipes 10 and 12 are connected to the upper and lower adhesion fixation sections. The bubble supply section 8 is set to the lower portion of the membrane cartridge and bubbles by aeration move upward while oscillating hollow fiber membranes.

Figure 3:
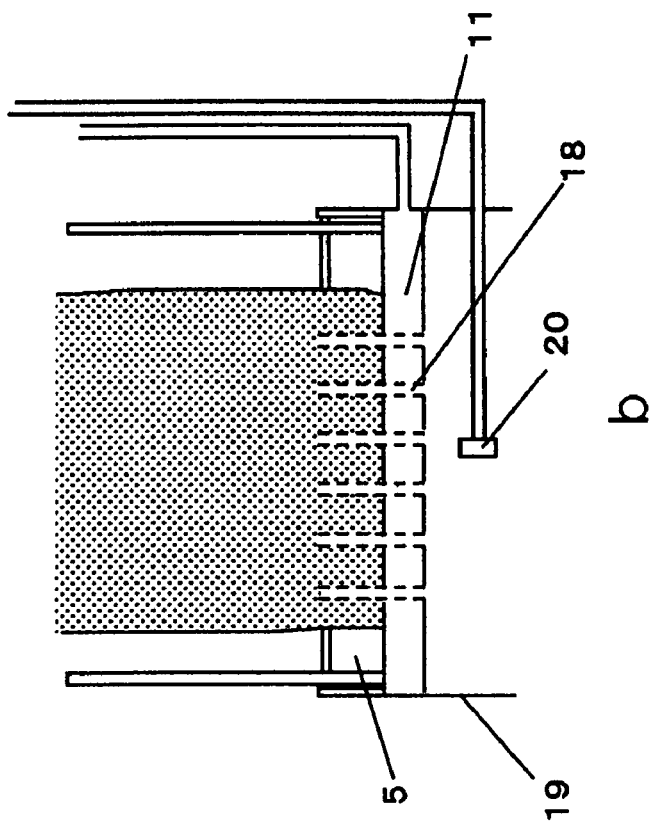
Figure 3:
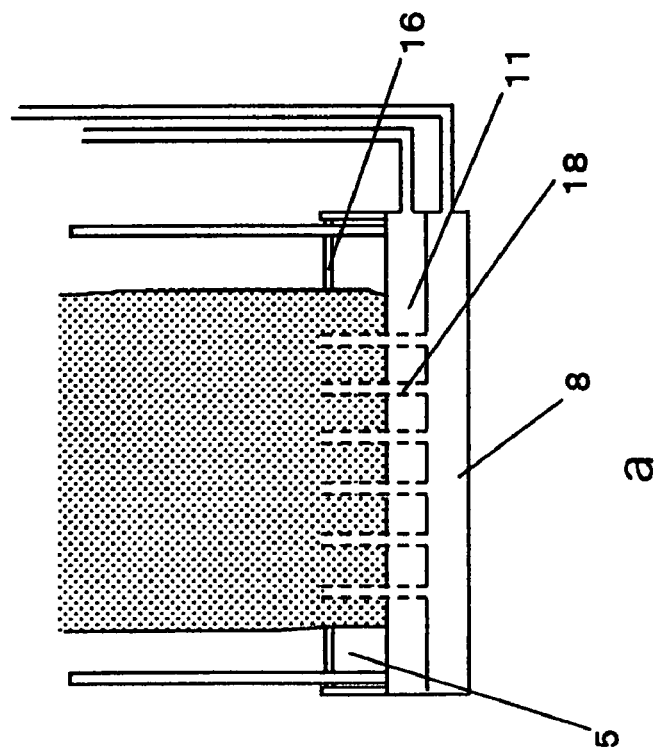

To integrate the bubble supply section 8 with the membrane cartridge, the bubble supply section 8 is connected to the lower portion of the catchment chamber 11 as shown in FIG. 3(*a*). Moreover, it is possible to apply gas to hollow fiber membranes by forming through-holes 18 continuing from the bubble supply section 8 up to the filtration section-side interface 16 of the lower-side adhesion fixation layer by passing through the lower-side adhesion fixation layer 5. Moreover, it is possible to form the lower portion of the lower-side adhesion fixation layer 5 into an opened skirt 19 and set a gas jetting port 20 without closing the bubble supply section as shown in FIG. 3(*b*).

It is preferable that the size of through-holes ranges from 2 to 30 mm in an equivalent diameter. The shape of through-hole is optionally selected from a polygon such as a triangle, quadrangle, or hexagon, circle, ellipse, sector, C-shape, or star. It is preferable that the number of through-holes is 2 to 300 though it depends on the cross-sectional area of a membrane cartridge or the number of fibers. It is possible to set positions of the through-holes to optional positions in the lower-side adhesion fixation layer 5. However, it is preferable to uniformly disperse the through-holes in order to uniformly oscillate all hollow fiber membranes.

It is preferable that the skirt 19 is protruded to a position lower than the catchment chamber 11 and fixed to the outer periphery of a hollow fiber membrane bundle. It is preferable that the length protruded from the lower portion of the catchment chamber ranges from 5 to 300 mm in order to prevent dissipation of gas from the lower portion though it depends on the size of the membrane cartridge, the amount of supplied gas, and the number and diameter of through-holes. The length of 300 mm or less is preferable because a wasted space is small over the entire length of a cartridge. The length of 5 mm or more is preferable because the gas supplied to the cartridge is effectively led to the through-holes but it is not dissipated in the transverse direction.

For uniformly passing the gas spouted from the gas jetting port 20 through plural through-holes 18, it is necessary that the gas spouted from the gas jetting port 20 forms a gas pool on the skirt 19 and gas is supplied from the gas pool to each through-hole. The thickness of the gas pool is preferably 30 mm or more, more preferably 50 mm or more. It is preferable to determine the position of the gas jetting port 20 for aeration by taking into account the thickness of a gas pool to be formed.

Though the size of a hollow fiber membrane cartridge adhesion fixation section (the size when viewing the hollow fiber membrane cartridge from the upper portion or lower portion after setting the cartridge so as to arrange the hollow fiber membranes vertically) is optional, in the case of a rectangle structure it is preferable that the aspect ratio (length: width) of the rectangle structure is 3:1 or more and 50:1 or less. When the aspect ratio is smaller than 3:1, a channel when sludge passes between small bundles relatively becomes long but when the aspect ratio is larger than 50:1, a percentage for bubbles to dissipate to the outside of a cartridge increases before the bubbles passing between membrane bundles reach the upper adhesion fixation layer.

It is preferable that the vertical length of a hollow fiber membrane cartridge ranges from 300 to 3000 mm.

In the present invention, to prevent the rise or twist of the lower-side adhesion fixation layer 3 at the time of aeration, the upper-side adhesion fixation layer 4 and lower-side adhesion fixation layer 5 are connected and fixed by any one of a rod, pipe, plate, chain, cord, and net. The rod or pipe is particularly preferable. It is preferable to use metal or resin as the material to be used. Though the shape of the rod or pipe is optional, it is preferable that the rod or pipe is cylindrical. A shape having an acute-angle corner is not very suitable because it causes a damage when a hollow fiber membrane repeatedly contacts. It is preferable to determine the thickness of the rod or pipe by taking into account the strength against deformation of the material used. Using a pipe or rod having a high hardness for connection is preferable because it is possible to prevent a damage when a hollow fiber membrane repeatedly contacts with the pipe or rod by coating the surface with resin of low hardness.

For a hole diameter of a hollow fiber membrane used for the present invention, it is possible to use a reverse osmosis membrane, ultrafilter or a precise filter. Moreover, the material of a hollow fiber membrane is not particularly limited, but the following are cited: polysulfone, polyether sulfone, polyacrylonitrile, polyimide, polyether imide, polyamide, polyether keton, polyether ether keton, polyethylene, polypropylene, poly-4-methylpenten, cellulose, cellulose acetate, polyvinylidene fluoride, polyethylene-tetrafluoroethylene copolymer, and polytetrafluoroethylene. Moreover, it is possible to use a compound material thereof. Furthermore, as the shape of a hollow fiber membrane, a membrane having an inside diameter ranging from 50 to 3000 μm and an inside/outside diameter ratio ranging from 0.3 to 0.8 is preferably used.

As an adhesive used for the present invention, any one of the following polymer materials is used: epoxy resin, urethane resin, epoxy acrylate resin, and silicon resin.

It is preferable that the resin hardness of the filtration section-side interface 15 of the upper-side adhesion fixation layer and the filtration section-side interface 16 of the lower-side adhesion fixation layer is 20 A or more and 90 A or less and it is more preferable that the resin hardness is 20 A or more and 70 A or less. If the hardness is 20 A or more, it is possible to keep a shape for a long time. If the hardness is 90 A or less, it is possible to sufficiently moderate a strain stress when a hollow fiber membranes oscillate. It is possible to adjust a resin hardness of an interface to a preferable range by using a resin having a low hardness as an adhesive and moreover bonding such a resin having a low hardness on a fixed layer adhered to a first stage. For example, it is possible to adjust a resin hardness of an interface by forming an adhesion fixation layer by an epoxy resin and then bonding a silicon resin on the epoxy resin or forming an adhesion fixation layer by an urethane resin and then bonding another urethane resin having a low hardness on the urethane resin. As bonding methods, publicly known methods such as centrifugal bonding method and stationary bonding method are known. To improve the shrinkage on curing or strength of an adhesive, it is also allowed to include a fiber-like object such as glass fiber or carbon fiber or fine powder such as carbon black, alumina, or silica in the above adhesive.

Materials of housings of the upper-side adhesion fixation section 2 and the lower-side adhesion fixation section 3 and the catchment chambers 9 and 11 are not particularly limited and they may be the same or different. However, thermoplastic resin or stainless steel is preferably used.

Figure 4:
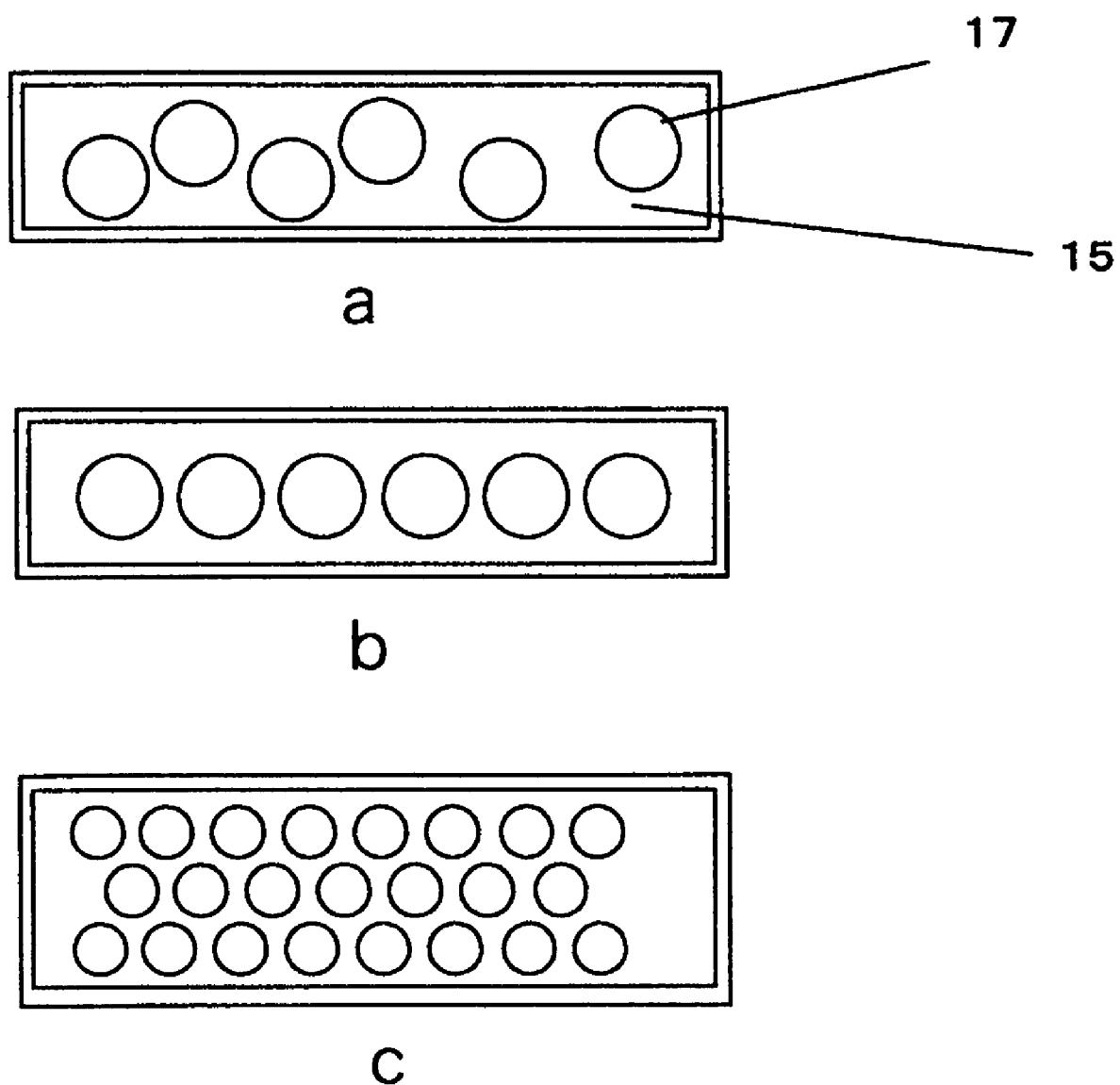
FIGS. 4(a), 4(b), and 4(c) are schematic diagrams showing an embodiment of a hollow fiber membrane arrangement on the filtration section-side interface of an upper-side adhesion fixation layer of a hollow fiber membrane cartridge of the present invention, respectively.

In the present invention, as shown in examples of FIGS. 4(*a*) to 4(*c*), the arrangement of small bundles of hollow fiber membranes on the filtration section-side interface of an upper-side adhesion fixation layer, irregularity is allowed as shown in FIG. 4(*a*) but it is preferable to linearly arrange the small bundles at equal intervals as shown in FIG. 4(*b*). Moreover, as shown in FIG. 4(*c*), the small bundles may be divided into plural rows. It is possible that the shape of a small bundle is not circular or sizes of small bundles are not equal.

EXAMPLES

Examples of the present invention are described below. However, the present invention is not restricted to the examples.

Example 1

Two cylindrical pipes 21 having a diameter of 1 cm and a length of 80 cm shown in FIG. 5(a) were arranged in parallel by keeping a distance of 2 m from each other to form a winding cassette and wound hollow fiber membranes 22. The pipes 21 were wound by rotating them at 1,650 times while adjusting a winding position so that hollow fiber membranes became small bundles at the one pipe side and became a single bundle at the other pipe side. As shown in FIG. 5(b), traverse was conducted when winding the hollow fiber membrane 22 so that the bundle was divided from the side which became the lower position of a cartridge toward the side which became the upper position of the cartridge and confounding occurs between hollow fiber membranes.

Each of cylindrical pipes at the both ends on which hollow fiber membranes were wound was stationary-bonded in a housing 23 made of ABS resin by using a urethane resin 24 (made by SANYUREKKUSU Inc. "SA-6330 type"; hardness after curing: 98A) serving as an adhesion fixation layer in the ABS-resin housing 23. Thereafter, urethane resin 25 (made by SANYUREKKUSU Inc., "SA-6330 type"; hardness after curing: 56A) was fixed on the interface between bonding portion and nonbonding portion of hollow fiber membranes through stationary bonding.

A measuring method of resin hardness conformed to JIS K6253. Along the cutting direction 26 shown in FIG. 5(c), a housing, a urethane resin, and a cylindrical pipe were cut. The state of one of the cut cylindrical pipe was the end face shown in FIG. 5(d) and the other one of the cut cylindrical pipe was the state shown in FIG. 5(e). A catchment chamber and a catchment pipe were connected to each of the cut surfaces while keeping the hollow fiber membranes open. It is possible to use any connection method as long as connection is liquid-tightly made.

A hollow fiber membrane was a precise filtering membrane made of polyvinylidene fluoride and having a small hole diameter of 0.1 μm, outside diameter of about 1.25 mm, and inside diameter of 0.7 mm and the membrane area of the membrane cartridge was 25 m². A small bundle was formed by 110 hollow fiber membranes per bundle at the filtration section-side interface of the upper adhesion fixation layer and 30 small bundles were present. The distance between nearest small bundles was 5 mm.

In the connection of two pipes of the winding cassette, an upper-side adhesion fixation section and a lower-side adhesion fixation section were connected and fixed by using two pipes each one of which was obtained by covering a pipe made of SUS304 and having an outside diameter of 13 mm with a vinylidene chloride film.

An aeration bubble supply section was set to a position 5 cm lower than the lower-side adhesion fixation layer.

A hollow fiber membrane cartridge produced thereby was immersed in an activated sludge tank having a volume of 8 m³, and the catchment chamber of the upper adhesion fixation layer and a filtrate pipe were connected, and fixed to the activated sludge tank.

Suction filtration was conducted using a suction pump so that a membrane-filtration flow rate is 0.6 m³/membrane area m²/day while aerating air of 10 Nm³/hr from the aeration bubble supply section to the hollow fiber membrane cartridge. The differential pressure between membranes in this case ranged between −15 and −20 kPa and was stable for three months. The concentration MLSS in the activated sludge tank in the evaluation period was 10000 mg/l on average and the average temperature was 25° C. City sewage water having an average BOD of 150 mg/l and SS of 160 mg/l was used for the raw water of activated sludge.

The weight of the sludge fouling or contaminants attached to the cartridge after operation was 0.84 kg and it was found that the attached quantity was small. Weights of the cartridge before and after operation were measured for wet hollow fiber membranes and the weight difference was defined as the weight of sludge fouling or contaminants.

Example 2

Two cylindrical pipes 21 having a diameter of 1 cm and a length of 80 cm shown in FIG. 5(a) were arranged in parallel by keeping a distance of 1.4 m from each other to form a winding cassette and wound hollow fiber membranes 22. The winding method, the bonding and fixing method by urethane resin and the cutting method were conducted in the same manner as in Example 1.

Open were end surfaces of the hollow fiber membranes at the side where small bundles of the hollow fiber membranes were constituted, while close were the opposite end surfaces of the hollow fiber membranes at the side where the end surfaces were buried inside the urethane resin. A catchment chamber and a catchment pipe were connected only to the end surfaces of the hollow fiber membranes at the side where small bundles of the hollow fiber membranes were constituted. The hollow fiber membranes were the same as those used in Example 1. The membrane area of the hollow fiber membrane cartridge was 17.5 m². A small bundle was formed by 110 hollow fiber membranes per bundle at a filtration section-side interface of the upper adhesion fixation layer and 30 small bundles were present. The distance between nearest small bundles was 5 mm.

In the connection of two pipes of the winding cassette, an upper-side adhesion fixation section and a lower-side adhesion fixation section were connected and fixed by using two pipes each one of which was covering a pipe made of SUS304 and having an outside diameter of 13 mm with a vinylidene chloride film.

An aeration bubble supply section was set to a position 5 cm lower than the lower-side adhesion fixation layer.

A hollow fiber membrane cartridge produced thereby was immersed in an activated sludge tank having a volume of 8 m³, and the catchment chamber of the upper adhesion fixation layer and a filtrate pipe were connected, and fixed to the activated sludge tank.

Suction filtration was conducted using a suction pump so that a membrane-filtration flow rate is 0.6 m³/membrane area m²/day while aerating air of 10 Nm³/hr from the aeration bubble supply section to the hollow fiber membrane cartridge. The differential pressure between membranes in this case ranged between −15 and −20 kPa and was stable for three months. The concentration MLSS in the activated sludge tank in the evaluation period was 10000 mg/l on average and the average temperature was 25° C. City sewage water having an average BOD of 150 mg/l and SS of 160 mg/l was used for the raw water of activated sludge.

The weight of the sludge fouling or contaminants attached to the cartridge after operation was determined in the same manner as in Example 1. As a result, the weight was 0.65 kg and it was found that the attached quantity was small.

Example 3

The hollow fiber membranes, the number thereof and the housing which are the same as those of Example 1 were used and all hollow fiber membranes were collected to one bundle and they are entwined to a state in which there was confounding between hollow fiber membranes. Thereafter, the hollow fiber membranes at one end were divided into the bundles shown in FIG. 4(b) and the other end was divided as shown in FIG. 4(c). Under this state, stationary bonding was carried out together with the catchment chamber, the catchment pipe, and the housing the same resin as that used in Example 1. The bonding was conducted while keeping both ends of the hollow fiber membranes open. The procedure after that was carried out similarly to Example 1.

As a result of carrying out the same evaluation as the case of Example 1, the differential pressure between membranes ranged from −15 and −21 kPa and it was stable for three months. Moreover, the sludge fouling or contaminants attached to the cartridge after operation was 0.78 kg and it was found that the attached quantity is small.

Comparative Example 1

Evaluation was made by an activated sludge tank in the same filtration conditions as the case of the Example 1 except that the arrangement of hollow fiber membranes on the filtration section-side interface of the upper-side adhesion fixation layer was not divided into small bundles but it was formed into a single bundle structure.

In this case, the differential pressure between membranes suddenly rises for 14 days, reached up to −80 kPa, and pump suction becomes impossible.

Similarly to the case of Example 1, the concentration MLSS in the activated sludge tank in the evaluation period was 10000 mg/l on average and the average temperature was 25° C. City sewage water having average BOD of 150 mg/l and SS of 160 mg/l was used for the raw water of activated sludge.

The weight of sludge fouling or contaminants attached to the cartridge after operation was 6.4 kg and it was found that the fouling weight was extremely large.

Comparative Example 2

Evaluation was made by an activated sludge tank in the same filtration conditions as the case of the Example 2 except that the arrangement of hollow fiber membranes on the filtration section-side interface of the upper-side adhesion fixation layer was not divided into small bundles but it was formed into a single bundle structure.

In this case, the differential pressure between membranes suddenly rises for 12 days, reached up to −80 kPa, and pump suction becomes impossible.

Similarly to the case of Example 2, the concentration MLSS in the activated sludge tank in the evaluation period was 10000 mg/l on average and the average temperature was 25° C. City sewage water having average BOD of 150 mg/l and SS of 160 mg/l was used for the raw water of activated sludge.

The weight of sludge fouling or contaminants attached to the cartridge after operation was 5.7 kg and it was found that the fouling weight was extremely large.

INDUSTRIAL APPLICABILITY

The hollow fiber membrane cartridge of the present invention can be preferably used in the field of membrane filtration, in particular for a suction-type tank filtration device or an immersion-type filtration device.

The invention claimed is:

1. A hollow fiber membrane cartridge comprising a hollow fiber membrane bundle consisting of plural hollow fiber membranes and arranged in vertical direction in an immersion bath; and adhesion fixation layers for adhering and fixing the hollow fiber membrane bundle at both ends thereof, in which hollow portions of the hollow fiber membranes are open at least the end of an upper-side adhesion fixation layer, and the hollow fiber membrane bundle is in a state of plural small bundles on a filtration section-side interface of the upper-side adhesion fixation layer and is divided into plural small bundles between a lower-side adhesion fixation layer and the upper-side adhesion fixation layer and there are more bundles at the upper-side adhesion fixation layer than at the lower-side adhesion fixation layer.

2. A hollow fiber membrane cartridge comprising a hollow fiber membrane bundle consisting of plural hollow fiber membranes and arranged in vertical direction in an immersion bath; and adhesion fixation layers for adhering and fixing the hollow fiber membrane bundle at both ends thereof, in which hollow portions of the hollow fiber membranes are open at least the end of an upper-side adhesion fixation layer, and the hollow fiber membrane bundle is in a state of plural small bundles on a filtration section-side interface of the upper-side adhesion fixation layer, and is divided into plural small bundles between a lower-side adhesion fixation layer and the upper-side adhesion fixation layer and there is confounding between the hollow fiber membranes.

3. The hollow fiber membrane cartridge according to claim 1, wherein in the plural small bundles of hollow fiber membranes on the filtration section-side interface of the upper-side adhesion fixation layer, the distance between the nearest hollow fiber membranes is less than 2 mm in each small bundle, and the number of hollow fiber membranes constituting each small bundle is 10 or more and 1000 or less, and the distance between the nearest small bundles is 2 mm or more and 100 mm or less.

4. The hollow fiber membrane cartridge according to claim 1, in which the upper-side and lower-side adhesion fixation layers include a resin, respectively, and the hardness (measured in accordance with JIS K6253) of the resin at the filtration section-side interface(s) of either or both of the adhesion fixation layers is 20 A or more and 90 A or less.

5. The hollow fiber membrane cartridge according to claim 2, wherein in the plural small bundles of hollow fiber membranes on the filtration section-side interface of the upper-side adhesion fixation layer, the distance between the nearest hollow fiber membranes is less than 2 mm in each small bundle, and the number of hollow fiber membranes constituting each small bundle is 10 or more and 1000 or less, and the distance between the nearest small bundles is 2 mm or more and 100 mm or less.

6. The hollow fiber membrane cartridge according to claim 2, in which the upper-side and lower-side adhesion fixation layers include a resin, respectively, and the hardness (measured in accordance with JIS K6253) of the resin at the filtration section-side interface(s) of either or both of the adhesion fixation layers is 20 A or more and 90 A or less.

* * * * *

UNITED STATES PATENT AND TRADEMARK OFFICE
CERTIFICATE OF CORRECTION

PATENT NO. : 7,704,394 B2  Page 1 of 1
APPLICATION NO. : 11/666691
DATED : April 27, 2010
INVENTOR(S) : Tomotaka Hashimoto et al.

It is certified that error appears in the above-identified patent and that said Letters Patent is hereby corrected as shown below:

In claim 1, column 12, line 14, "open at least the end" should read --open at at least the end--.

In claim 2, column 12, line 28, "open at least the end" should read --open at at least the end--.

Signed and Sealed this

Thirty-first Day of August, 2010

David J. Kappos
*Director of the United States Patent and Trademark Office*